United States Patent Office 2,994,668
Patented Aug. 1, 1961

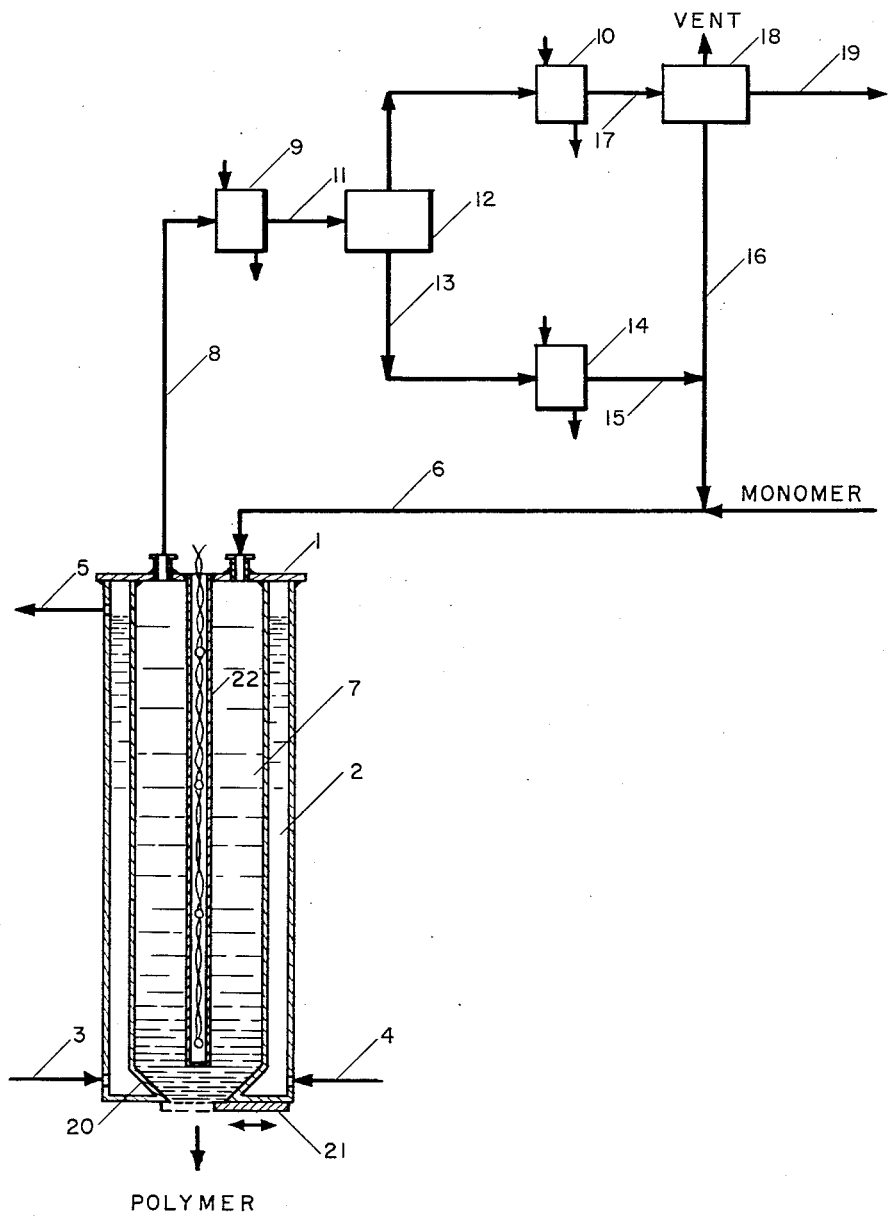

2,994,668
PROCESS OF POLYMERIZING 3,3-BIS(CHLORO-METHYL)OXETANE
Eugene D. Klug, Wilmington, Del., assignor to Hercules Powder Company, Wilmington, Del., a corporation of Delaware
Filed Nov. 18, 1957, Ser. No. 697,010
10 Claims. (Cl. 260—2)

This invention relates to a process of polymerization and, more particularly, to a continuous process of polymerizing 3,3-bis(chloromethyl)oxetane to products of high molecular weight.

In the production of high molecular weight polymers of 3,3-bis(chloromethyl)oxetane, a large amount of heat is evolved. In order to make polymer of sufficiently high molecular weight to be useful, that is, having a specific viscosity of at least 1.0 and preferably 1.4 or more, a considerable amount of this heat must be dissipated. In batch reactions the removal of this heat by transfer through the walls of a reactor is very difficult due to the poor heat conductivity of the viscous polymer. Furthermore, the polymer is so viscous, particularly as it approaches high molecular weight viscosities, that agitation of the mass becomes impractical. Additionally, although it is known to use inert solvents in instances where it is desirable or necessary to remove exothermic heat, inert solvents have certain disadvantages. Basically, inert solvents are selected liquids boiling at the temperature at which it is desired to effect polymerizaiton or somewhat below the polymerization temperature in order to effect a sufficiently rapid rate of heat removal to maintain the reaction mass at the desired temperature. This, of course, tends to prolong the reaction time, but more seriously, much larger equipment must be used to prepare a given amount of polymer since considerable amount of solvent is usually required. Thus, a solvent recovery system of considerable size must be added to meet the economic requirements of such a system.

Still further, for the continuous production of high molecular weight polymers of 3,3-bis(chloromethyl)oxetane, a tubular reactor of the coiled tube type was employed. This reactor utilized a tube of very small diameter in which the heat of polymerization was removed through the walls of the tube. However, it was found that although this type reactor was to an extent suitable for preparation of the polymers, it had the extreme disadvantage of being very difficult to control. More specifically, the pressure build-up and lack of temperature control due to complicated flow patterns in the tube prevented the consistent preparation of useful polymer. It was found that this, in part, was due to the difficulty of removing just the right amount of heat from the polymer and that when overcooling developed, the viscosity increased and caused undue pressure build-up which rendered the tubular reactor, from an overall practical viewpoint, unsatisfactory.

Therefore, the primary object of this invention is to provide a simple and economical continuous process for the production of high molecular weight polymers of 3,3-bis(chloromethyl)oxetane. A further object is to avoid the disadvantages inherent in the processes hereinabove discussed. Other objects of the invention will appear hereinafter, the novel features and combinations being set forth in the appended claims.

The above objects are accomplished in accordance with this invention by continuously feeding 3,3-bis(chloromethyl)oxetane monomer and polymerization catalyst therefor into a substantially vertical polymerization zone containing a mass of such material being polymerized, removing excess exothermic heat of polymerization from the mass by boiling and substantial vaporization of the monomer as it continuously descends into said mass, maintaining a body of polymer at the bottom of the polymerization zone to effect substantially complete polymerization of polymer therein, and continuously withdrawing substantially completely polymerized product from the bottom of the polymerization zone at a rate to maintain a substantially constant mass of material being polymerized in the polymerization zone.

For example, the operation of the present invention may be carried out in the following manner, as illustrated by the accompanying drawing, in which the figure represents diagrammatically, and partly in section, suitable apparatus for carrying the invention into effect.

As shown in the drawing, there is provided a closed-top polymerization tower 1 which has a heating jacket 2 for liquid or vapor heating medium. Ingress of the heating medium, which may be hot oil, is supplied to the heating jacket 2 through lines 3 and 4, and egress of the heating medium from the jacket is through line 5. Cold monomer and catalyst, with or without added low boiling solvent as desired, are continuously fed through line 6 to the tower 1 and pass into the polymerization zone represented by 7. As will be noted, the top of the polymerization tower 1 is sealed to confine the vapors evolved since the liquid stream entering the tower through line 6 polymerizes in zone 7 and boiling occurs. At this point it is important to point out that the polymerization temperature is controlled by the material being fed through line 6 into the polymerization zone 7. In this respect, the heat of polymerization in excess of that required to heat the polymer to reaction temperature, for an acceptable viscosity polymer, is removed by heating the monomer and solvent, if used, to their boiling points and evaporating them. Thus, it will be appreciated that the sole purpose of the jacket 2 is to supply heat for initiating the reaction for a start-up after which the heating jacket becomes substantially functionless, except to prevent the polymer from solidifying on the wall of the tower, as the polymerization proceeds adiabatically in the reaction or polymerization zone 7.

The vapors emanating from the top of tower 1 pass through line 8 to a condenser 9. This vapor stream is separated into monomer and solvent fractions if a solvent is used. As illustrated in the drawing, this may be accomplished by operating two condensers in series, the first or monomer condenser 9 maintained at an elevated temperature to condense most of the monomer and the second or solvent condenser 10 maintained cold to condense all the solvent and any monomer passing the first condenser. It will be understood, of course, that if the boiling points of the monomer and the particular solvent chosen are close, fractionation equipment must be utilized. Referring again to the drawing, the monomer from condenser 9 passes through line 11 to a hold tank 12 from which it passes through line 13 to a monomer cooling vessel 14. Here the condensed monomer is cooled to approximately the temperature of the fresh feed monomer and is passed through lines 15 and 16 as recycle stock to the fresh monomer feed passing through line 6. Here, again, it will be understood that if the fresh monomer passing line 6 contains catalyst which will cause premature polymerization and consequent plugging at moderate temperatures, sufficient cooling must be employed to prevent this. The condensed solvent from condenser 10, when a solvent is used, passes through line 17 into a vented hold tank 18. A portion of this condensed solvent is passed through line 16 into the feed stream passing through line 6 in a ratio such that the addition of the condensed solvent plus the solvent contained in the feed stream serves to aid in control of the temperature of the feed stream for its passage into and activity within the polymerization zone 7. The excess solvent from vented hold tank 18 passes through line 19 to storage and the uncondensed vapors are passed to atmosphere. As hereinbefore pointed out, a solvent may or may not be used in accordance with this invention. However, it has been found that dilute solvent solutions afford a very convenient means for adding very small amounts of catalyst to the fresh monomer feed. Furthermore, the mixture of fresh feed reflux monomer and reflux solvent with temperature control thereof before entering the polymerization zone 7 may be utilized to insure uniform temperatures of reaction and uniform catalyst concentration within the polymerization zone. Accordingly, it will be appreciated that the solvent when utilized will be found desirable to the extent of convenience for catalyst addition and for the aforementioned temperature control which involves minor amount. As the polymerization continuously proceeds, the viscous molten polymer mass slowly settles by gravity to the bottom part of the tower 1 and its rate of discharge from the bottom conical section 20 of the tower 1 is controlled by a variable opening, discharge gate 21, which is so operated to maintain a body of polymer immediately thereabove and to maintain the tower in balance relative to charge and discharge. A column 22 containing a plurality of thermocouples is concentrically disposed and extends substantially throughout the height of the tower 1 and the readings of these thermocouples serve to aid in maintaining the body of polymer referred to and also serve to show that the final temperature of the polymer is considerably above the boiling point of the feed stream, since the very viscous mass ceases to boil while still containing some monomer although it then continues to substantially complete polymerization adiabatically.

The above description has been restricted, for the sake of clarity, to a general description of the process of this invention and apparatus suitable for carrying the process into effect. There now follows an example of a continuous run demonstrating the principle of the invention. All parts and percentages are by weight throughout the specification unless otherwise designated, and where specific viscosity is given it is measured as a 1% solution of the polymer in cyclohexanone at 50° C.

Example

A stainless steel jacketed tower 5 feet long and 6 inches in diameter was fitted with a variable opening gate at the bottom thereof for discharge of polymer and was fitted with a monomer condenser and feed line at the top thereof for charge of monomer as illustrated in the drawing. Hot oil was circulated through the jacket of the tower at a temperature of 205–212° C. for a sufficient length of time to bring the tower to reaction temperature. Monomeric 3,3-bis(chloromethyl)oxetane containing triethylaluminum catalyst was continuously added to the top of the tower at room temperature. After 185 minutes of residence, the discharge gate was opened for continuous removal of polymer from the bottom of the tower at a rate to balance the amount of feed stock charged thereto and retained. In this manner, the system was placed in continuous operation and samples were analyzed from time to time during the continuous operation. The data are presented in the following table:

Table

| Time, min. | Feed Rate, ml./min. | Catalyst Concn., p.p.m. | Peak Reactor Temp., ° C. | Sp. Visc. | Percent Poly. |
|---|---|---|---|---|---|
| 0 | 35 | 300 | 207 | | |
| 45 | 65 | 300 | 223 | | |
| 60 | 90 | 225 | 224 | | |
| 98 | 100 | 225 | 228 | | |
| 185 | 100 | 226 | 226 | 1.68 | 88.8 |
| 200 | 100 | 226 | | 1.30 | 82.9 |
| 215 | 100 | 226 | | 1.95 | 81.2 |
| 230 | 100 | 226 | 225 | 1.50 | 87.6 |
| 245 | 100 | 226 | 226 | 1.71 | 80.2 |
| 315 | 100 | 226 | 226 | 1.97 | 81.1 |
| 355 | 100 | 226 | 225 | 1.80 | 78.6 |
| 415 | 100 | 226 | 226 | 2.00 | 79.9 |
| 445 | 100 | 226 | 223 | 1.56 | 79.2 |
| 475 | 100 | 226 | 228 | 1.83 | 79.0 |
| 506 | 100 | 226 | 229 | 1.73 | 79.9 |
| 535 | 105 | 226 | 232 | 1.96 | 78.4 |
| 565 | 105 | 226 | | 1.79 | 84.8 |
| 595 | 105 | 226 | | 1.57 | 82.7 |
| 600 | 105 | 300 | 212 | | |
| 690 | 105 | 300 | | 1.45 | 73.1 |
| 760 | 105 | 225 | 228 | | |
| 800 | 105 | 225 | 225 | 1.35 | 81.9 |

With reference to the above table, it will be seen that the specific viscosity of the polymer obtained was uniformly high with an average of about 1.7 and that the average percent of polymer obtained was in good yield during the entire continuous run of over 13 hours from start-up time. Although the aforedescribed continuous operation employed triethylaluminum as the catalyst, other suitable catalysts include additional aluminum alkyl catalysts such as those disclosed in copending application Serial No. 606,229, filed August 27, 1956, U.S. Patent 2,895,922; the aluminum alkoxide catalysts such as those disclosed in copending application Serial No. 606,217, filed August 27, 1956, U.S. Patent 2,895,921; and the aluminum chloride catalyst for use at elevated temperatures such as disclosed in copending application Serial No. 606,228, filed August 27, 1956, U.S. Patent 2,905,647. Although a catalyst level of from about 200 to about 300 p.p.m. was employed in the foregoing example, a catalylst level of from about 100 to about 1,000 p.p.m. will be found suitable for the production of high-grade polymer.

From the foregoing it is evident that there are several factors which will influence conditions for the most satisfactory operation of the invention. For example, the flow temperature of the polymer mass is from about 180 to about 250° C. nad the polymer body within the lower part of the tower must be maintained within this range to obtain the desired gravity flow for discharge of the polymer. Moreover, it will be appreciated that cooling is effected by (1) vaporization of monomer and (2) heat transfer between cold monomer and the hot polymer at the zone of rapid polymerization. If the control due to these two factors is not great enough due to, for example, a too rapid throughput, additional control may be obtained by the introduction of a small amount of a volatile inert liquid. This liquid should be sufficiently volatile so that its evaporation contributes to the control on the polymerization and not be retained in significant amounts in the polymer. On the other hand, it should not be so volatile that it flashes off before it comes into thorough contact with the polymerizing mass. Such liquid may be inert hydrocarbon such as heptane, decane or dodecane and halogenated hydrocarbons such as carbon tetrachloride, tetrachloroethane and trifluoro-1,1,2-tribromoethane and should preferably boil in the range 150–175° C. A small amount of such liquid, added to the tower after polymerization has begun, may be retained in the system indefinitely. It can only be lost in the polymer which leaves the tower. Since ordinarily the polymer leaving the tower has a temperature about 50° C. above the boiling point of the inert liquid, it does not entrain the inert liquid to any appreciable extent. Assuming that only 5% of the monomer in the tower is polymerizing vigorously, an amount of inert liquid corresponding to 10% of this or 0.5% of the material in the tower gives a large measure of additional temperature control if and when needed without bulking the size of the polymerization tower.

Although it is not intended that the invention be limited to any particular theory of operation, there is evidence that some polymerization occurs after the monomer ceases to boil and the polymer containing dissolved monomer flows down through the polymerization zone. Thus, an important factor in determining the extent of polymerization is the maintaining of a body of polymer at the bottom of the polymerization zone to effect substantially complete polymerization therein. The remaining factors such as peak temperature, nature of the catalyst, and the quantity of catalyst are susceptible to accurate control and selection. As previously pointed out, any of the three classes of aluminum compounds may be used as catalyst. Since some polymerization occurs even at room temperature, it is preferable to mix the catalyst and monomer just before they are fed into the polymerization tower. This is conveniently done by dissolving the catalyst in a suitable inert solvent and mixing the two liquid streams just before they enter the polymerization tower. Additionally, in some instances it may be desirable to cool the monomer prior to its introduction into the polymerization tower to prevent any premature polymerization. A temperature of from about 20 to about 30° C. has been found suitable to accomplish this with, of course, utilization of the lower temperatures as the catalyst amount is increased.

The apparatus used in conjunction with this invention is preferably a vertical jacketed elongated tube having a ratio of height to diameter in the order of 10:1 with conventional appurtenances therewith as set forth in the appended drawing. Since the reaction is substantially adiabatic, as previously pointed out, the purpose of heating the vessel is to initiate polymerization during start-up and to facilitate flow of the polymer down the tower by keeping the polymer next to the walls of the tower as warm as they are in the interior. Generally, the length of the tower may be varied depending on the flow rate and the height of the column of molten polymer. However, since there is considerable foaming during the polymerization, the amount of polymerizable mass in the tower at any one time should be adjusted so that there is considerable free space above the reaction zone. Thus, although the height of the column is not critical, it is quite important since a high tower will give considerable flexibility in residence time and improved flow rate without resort to pressure. Thus, for a given discharge opening in the bottom of the tower, an increase in hydraulic head will give a greater flow rate. It will be evident that the discharge gate at the bottom of the polymerization tower should be sufficiently large so that the flow of polymer may be easily regulated. The flow of material into and from the tower is essential for maintaining a substantially constant mass of material in the tower.

The high molecular weight polymers obtained in accordance with this invention may be separated from the polymerization reaction mass by standard procedures such as quenching the molten reaction mixture in a polymer nonsolvent such as methanol, water or carbon tetrachloride or the mass may be cooled, ground, and, if necessary, washed. Moreover, the polymers obtained had specific viscosities, at 50° C. of a 1% cyclohexanone solution of the polymer, of between 0.3 and 4.0 and even greater, thus showing that polymers having molecular weights in excess of 10,000 and much greater are obtainable. The desired specific viscosity of these polymers for general plastics use is in the order of 1.5–2.0 which is readily attainable by this invention.

Furthermore, the polymers produced in accordance with this invention are suitable for the various conventional thermoplastic uses such as molding to form various shaped articles; extrusion to form articles such as film, filaments, sheeting, strip and tubing; calendering to form film, sheeting and coating of paper or fabric; and laminating to form counter tops, industrial board and the like.

It will be seen, therefore, that this invention may be carried out by the use of various modifications and changes without departing from its spirit and scope.

What I claim and desire to protect by Letters Patent is:

1. In a continuous bulk polymerization process for the production of high molecular weight polymer of 3,3-bis(chloromethyl)oxetane wherein 3,3-bis(chloromethyl)oxetane monomer is contacted with a polymerization catalyst capable of polymerizing 3,3-bis(chloromethyl)oxetane monomer to a high molecular weight polymer, and in which process a large amount of heat of polymerization is rapidly evolved, the improvement which comprises continuously feeding ingredients consisting essentially of 3,3-bis(chloromethyl)oxetane monomer and polymerization catalyst therefor into the top of a substantially vertical polymerization zone of sufficient diameter to permit gravity flow therethrough of a mass of such material being polymerized therein, removing excess exothermic heat of polymerization from the mass by boiling and substantial vaporization of the monomer as it continuously descends into said catalyst containing mass, maintaining a body of molten polymer at the bottom of the polymerization zone to effect substantially complete polymerization of monomer dissolved therein, and continuously withdrawing substantially completely polymerized product in molten form from the bottom of the polymerization zone at a rate to maintain a substantially constant mass of material being polymerized in the polymerization zone.

2. In a continuous bulk polymerization process for the production of high molecular weight polymer of 3,3-bis(chloromethyl)oxetane wherein 3,3-bis(chloromethyl)oxetane monomer is contacted with a polymerization catalyst capable of polymerizing 3,3-bis(chloromethyl)oxetane monomer to a high molecular weight polymer, and in which process a large amount of heat of polymerization is rapidly evolved, the improvement which comprises continuously feeding ingredients consisting essentially of 3,3-bis(chloromethyl)oxetane and polymerization catalyst therefor into the top of a substantially vertical, elongated polymerization zone of sufficient diameter to permit gravity flow therethrough of a mass of such material being polymerized therein, removing excess exothermic heat of polymerization from the mass by boiling and substantial vaporization of the monomer as it continuously descends into said catalyst containing mass, maintaining a body of molten polymer at the bottom of the polymerization zone to effect substantially complete polymerization of monomer dissolved therein, and continuously withdrawing substantially completely polymerized product in molten form from the bottom of the polymerization zone at a rate to maintain a substantially constant mass of material being polymerized in the polymerization zone.

3. In a continuous bulk polymerization process for the production of high molecular weight polymer of 3,3-bis(chloromethyl)oxetane wherein 3,3-bis(chloromethyl)oxetane monomer is contacted with a polymerization catalyst capable of polymerizing 3,3-bis(chloromethyl)oxetane monomer to a high molecular weight polymer, and in which process a large amount of heat of polymerization is rapidly evolved, the improvement which comprises continuously feeding ingredients consisting essentially of 3,3-bis(chloromethyl)oxetane monomer and polymerization catalyst therefor into the top of a substantially vertical, elongated polymerization zone of sufficient diameter to permit gravity flow therethrough of a mass of such material being polymerized therein, removing excess exothermic heat of polymerization from the mass by boiling and substantial vaporization of the monomer as it continuously descends into said catalyst containing mass, maintaining a body of molten polymer at the bottom of the polymerization zone at a temperature of from about 180° C. to about 250° C. to effect substantially complete polymerization of monomer dissolved therein and to effect gravity flow therefrom, and continuously withdrawing substantially completely polymerized product in molten form from the bottom of the polymerization zone at a rate to maintain a substantially constant mass of material being polymerized in the polymerization zone.

4. A process as defined in claim 3 in which a solution of the catalyst is added to the monomer immediately prior to feeding the mixture into the polymerization zone.

5. A process as defined in claim 3 in which the monomer is cooled prior to feeding it into the polymerization zone.

6. In a continuous bulk polymerization process for the production of high molecular weight polymer of 3,3-bis(chloromethyl)oxetane wherein 3,3-bis(chloromethyl)oxetane monomer is contacted with a polymerization catalyst capable of polymerizing 3,3-bis(chloromethyl)oxetane monomer to a high molecular weight polymer, and in which process a large amount of heat of polymerization is rapidly evolved, the improvement which comprises continuously feeding ingredients consisting essentially of 3,3-bis(chloromethyl)oxetane monomer and polymerization catalyst therefor into the top of a substantially vertical polymerization zone of sufficient diameter to permit gravity flow therethrough of a mass of such material being polymerized therein, removing excess exothermic heat of polymerization from the mass by boiling and substantial vaporization of the monomer as it continuously descends into said catalyst containing mass, condensing the vaporized monomer and recycling the condensed monomer to the polymerization zone, maintaining a body of molten polymer at the bottom of the polymerization zone to effect substantially complete polymerization of monomer dissolved therein, and continuously withdrawing substantially completely polymerized product in molten form from the bottom of the polymerization zone at a rate to maintain a substantially constant mass of material being polymerized in the polymerization zone.

7. In a continuous bulk polymerization process for the production of high molecular weight polymer of 3,3-bis(chloromethyl)oxetane wherein 3,3-bis(chloromethyl)oxetane monomer is contacted with a polymerization catalyst capable of polymerizing 3,3-bis(chloromethyl)oxetane monomer to a high molecular weight polymer, and in which process a large amount of heat of polymerization is rapidly evolved, the improvement which comprises continuously feeding ingredients consisting essentially of 3,3-bis(chloromethyl)oxetane monomer and polymerization catalyst therefor selected from the group consisting of aluminum alkyl catalysts, aluminum alkoxide catalysts and aluminum chloride catalyst into the top of a substantially vertical, elongated polymerization zone of sufficient diameter to permit gravity flow therethrough of a mass of such material being polymerized therein, removing excess exothermic heat of polymerization from the mass by boiling and substantial vaporization of the monomer as it continuously descends into said catalyst containing mass, maintaining a body of molten polymer at the bottom of the polymerization zone to effect substantially complete polymerization of monomer dissolved therein, and continuously withdrawing substantially completely polymerized product in molten form from the bottom of the polymerization zone at a rate to maintain a substantially constant mass of material being polymerized in the polymerization zone.

8. In a continuous bulk polymerization process for the production of high molecular weight polymer of 3,3-bis(chloromethyl)oxetane wherein 3,3-bis(chloromethyl)oxetane monomer is contacted with a polymerization catalyst capable of polymerizing 3,3-bis(chloromethyl)oxetane monomer to a high molecular weight polymer, and in which process a large amount of heat of polymerization is rapidly evolved, the improvement which comprises continuously feeding ingredients consisting essentially of 3,3-bis(chloromethyl)oxetane monomer and aluminum alkyl as polymerization catalyst therefor into the top of a substantially vertical, elongated polymerization zone of sufficient diameter to permit gravity flow therethrough of a mass of such material being polymerized therein, removing excess exothermic heat of polymerization from the mass by boiling and substantial vaporization of the monomer as it continuously descends into said catalyst containing mass, maintaining a body of molten polymer at the bottom of the polymerization zone to effect substantially complete polymerization of monomer dissolved therein, and continuously withdrawing substantially completely polymerized product in molten form from the bottom of the polymerization zone at a rate to maintain a substantially constant mass of material being polymerized in the polymerization zone.

9. In a continuous bulk polymerization process for the production of high molecular weight polymer of 3,3-bis(chloromethyl)oxetane wherein 3,3-bis(chloromethyl)oxetane monomer is contacted with a polymerization catalyst capable of polymerizing 3,3-bis(chloromethyl)oxetane monomer to a high molecular weight polymer, and in which process a large amount of heat of polymerization is rapidly evolved, the improvement which comprises continuously feeding ingredients consisting essentially of 3,3-bis(chloromethyl)oxetane monomer and aluminum alkoxide as polymerization catalyst therefor into the top of a substantially vertical, elongated polymerization zone of sufficient diameter to permit gravity flow therethrough of a mass of such material being polymerized therein, removing excess exothermic heat of polymerization from the mass by boiling and substantial vaporization of the monomer as it continuously descends into said catalyst containing mass, maintaining a body of molten polymer at the bottom of the polymerization zone to effect substantially complete polymerization of monomer dissolved therein, and continuously withdrawing substantially completely polymerized product in molten form from the bottom of the polymerization zone at a rate to maintain a substantially constant mass of material being polymerized in the polymerization zone.

10. In a continuous bulk polymerization process for the production of high molecular weight polymer of 3,3-bis(chloromethyl)oxetane wherein 3,3-bis(chloromethyl)oxetane monomer is contacted with a polymerization catalyst capable of polymerizing 3,3-bis(chloromethyl)oxetane monomer to a high molecular weight polymer, and in which process a large amount of heat of polymerization is rapidly evolved, the improvement which comprises continuously feeding ingredients consisting essentially of 3,3-bis(chloromethyl)oxetane monomer and aluminum chloride as polymerization catalyst therefor into the top of a substantially vertical, elongated polymerization zone of sufficient diameter to permit gravity flow therethrough of a mass of such material being polymerized therein, removing excess exothermic heat of polymerization from the mass by boiling and substantial vaporization of the monomer as it continuously descends into said catalyst containing mass, maintaining a body of molten polymer at the bottom of the polymerization zone to effect substantially complete polymerizaion of monomer dissolved therein, and continuously withdrawing substantially completely polymerized product in molten form from the bottom of the polymerization zone at a rate to maintain a substantially constant mass of material being polymerized in the polymerization zone.

References Cited in the file of this patent

UNITED STATES PATENTS

| | | |
|---|---|---|
| 2,616,872 | Bloen et al. | Nov. 4, 1952 |
| 2,895,921 | Price | July 21, 1959 |
| 2,895,922 | Goddu | July 21, 1959 |
| 2,905,647 | Goddu | Sept. 22, 1959 |

FOREIGN PATENTS

| | | |
|---|---|---|
| 492,682 | Canada | Aug. 5, 1953 |
| 492,683 | Canada | Aug. 5, 1953 |
| 474,959 | Canada | July 3, 1951 |
| 758,125 | Great Britain | Sept. 26, 1956 |